United States Patent Office 3,692,504
Patented Sept. 19, 1972

3,692,504
PROCESS FOR GELLING NORMALLY LIQUID HYDROCARBONS AND PRODUCT PRODUCED
Rufus V. Jones and Peter J. Canterino, Bartlesville, Okla., assignors to Phillips Petroleum Company
Filed May 19, 1953, Ser. No. 356,098
Int. Cl. C10l 7/02
U.S. Cl. 44—7 E                                       30 Claims

ABSTRACT OF THE DISCLOSURE

This invention relates to a process for the production of gelled compositions of matter containing gasoline and other normally liquid hydrocarbons such as benzene, toluene, xylenes, kerosene, naphthas, and the like, and to the compositions thus produced.

---

According to the invention, the process comprises dissolving a synthetic elastomer in a normally liquid hydrocarbon and treating the resulting solution with sulfur dioxide in the presence of asuitable catalyst.

Synthetic elastomers which are applicable are materials which have an appreciable degree of unsaturation. Homopolymers and copolymers of conjugated dienes are particularly preferred with the amount of conjugated diene employed generally being at least 50 parts by weight per 100 parts monomers. Copolymers are prepared by the copolymerization of a conjugated diene with a vinyl monomer such as styrene, alkyl-substituted styrenes, methyl acrylate, methyl methacrylate, methyl vinyl ketone, acrylonitrile, methacrylonitrile, vinylpyridine, 2-methyl-5-vinylpyridine and similar materials which are known to copolymerize with conjugated dienes. Any of the compounds which are known in the art as copolymerizable with butadiene and other conjugated dienes are applicable. Examples of elastomers are polybutadiene, polyisoprene, polypentadiene, polymethylpentadiene, and butadiene-styrene, butadiene-methyl acrylate, butadiene-methyl methacrylate, isoprene-styrene, butadiene-vinyl pyridine, and butadiene-2-methyl-5-vinyl-pyridine copolymers.

Normally liquid hydrocarbons which can be gelled according to the process of this invention include pentanes, hexanes, heptanes, octanes, cyclohexane, methylcyclohexane, benzene, toluene, xylenes, and various mixtures of aliphatic and/or aromatic hydrocarbons such as petroleum naphtha, gasoline, kerosene, etc. Synthetic elastomers which are applicable for gelling these hydrocarbons must be soluble in the hydrocarbon. For example, elastomers which are copolymers of conjugated dienes with styrene and various substituted styrenes such as alpha-methylstyrene or styrene containing one or more substituents in the ring are soluble in aromatic hydrocarbons and are, therefore, satisfactory for gelling these materials, but elastomers of this type are generally not sufficiently soluble in aliphatic hydrocarbons to be operable for these materials. For aliphatic hydrocarbons, or hydrocarbon mixtures containing large percentages of aliphatic hydrocarbons, elastomers such as polybutadiene, polyisoprene and copolymers of a major amount of a conjugated diene with a material copolymerizable therewith such as butadiene/acrylonitrile, butadiene/vinylpyridine, butadiene/methyl acrylate, and the like are generally employed.

Catalysts which are applicable are those which have been found effective when carrying out reactions between olefinic compounds and sulfur dioxide. Examples of catalysts include nitrates of the alkali metals such as sodium, potassium, and lithium nitrates, ammonium nitrate, potassium persulfate, hydrogen peroxide, organic peroxides such as benzoyl peroxide and di-tert-butyl peroxide, hydroperoxides such as dimethylphenylhydroperoxymethane, dimethyl(tert-butylphenyl)hydroperoxymethane, and dimethyl(isopropylphenyl)hydroperoxmethane, nitric acid, peracetic acid, diazoaminobenzene, and the like. Lithium nitrate is a catalyst which is frequently preferred. The amount of catalyst employed is generally in the range between 0.05 and 5 parts by weight per 100 parts elastomer.

When carrying out the process of this invention, a solution of the elastomer in the liquid hydrocarbon is prepared and charged to a reactor, the catalyst is added, and sulfur dioxide is then introduced. The sulfur dioxide can be introduced rapidly and the mixture then allowed to stand until gel formation occurs or it can be introduced at intervals allowing some time for reaction before the next portion is added.

Temperatures for carrying out the process will usually be in the range between 10 and 50° C. with temperatures in the range between 15 and 35° C. being most frequently preferred.

The products of this invention range from firm to fairly soft, sticky gels depending upon the amount of synthetic elastomer employed in relation to the liquid hydrocarbon and the amount of sulfur dioxide. It is especially to be noted that the gels of the invention are not hard or solid materials. In general the synthetic elastomer is employed in amounts in the range between 1 and 10 percent by weight based on the liquid hydrocarbon. The quantity of sulfur dioxide is generally expressed in relationship to the synthetic elastomer and is usually in the range between 0.5 and 20 percent by weight, preferably between 1 and 10 percent by weight, based on the elastomer. With smaller amounts of elastomer it is generally the practice to use a larger proportion of sulfur dioxide than is employed with larger amounts of elastomer. However, the manner of operation is governed by the type of gel desired.

The gelled compositions of this invention are prepared from normally liquid hydrocarbons, a synthetic elastomer, sulfur dioxide, and catalyst, and contain all of these materials. It is possible that the components in the compositions are present partially as reaction products with each other and partially as physical mixtures set up in the form of a gel structure. The gels range in consistency from firm to soft, sticky products and in appearance from translucent to opaque and from colorless to brown or reddish-brown.

The products of this invention find application where gelled gasoline has been employed in the past. They are particularly valuable for use in flame throwers and incendiary bombs. The products, in which sand or a similar substance is suspended, can be pumped under high pressure into oil wells to split the rock layers and thereby increase the productivity of the wells. A gel breaker is then pumped in which converts the liquid hydrocarbon to its original form. Another use for these products is to aid in the flow of gasoline through pipe lines.

It is known that natural rubber can be employed as a gelling agent for gasoline. Synthetic elastomers are not equivalent to natural rubber in this respect. For example, rubbery polybutadiene forms a very fluid solution in gasoline and no gel formation occurs even upon standing for extended periods. The addition of sulfur dioxide alone to a synthetic elastomer in a normally liquid hydrocarbon does not produce gel formation. However, very satisfactory gels are produced in the presence of a catalyst such as lithium nitrate. Thus, according to the invention, the use of a catalyst is of primary importance and is, therefore, a critical feature thereof.

EXAMPLE I

Polybutadiene, prepared by emulsion polymerization at 41° F. and having a Mooney value (ML-4) of 30, was dissolved in 60 octane gasoline (blend of isooctane and n-heptane) and a series of runs made using variable amounts of sulfur dioxide in the presence of lithium nitrate as a catalyst. One run was made without lithium nitrate. The reactions were carried out at room temperature. The amounts of the different materials used and the appearance of the reaction mixture after 16 hours are shown below.

| Polybutadiene | | $SO_2$ | | LiNO₃, cc.[1] | Appearance after— | |
|---|---|---|---|---|---|---|
| Grams | Wt. percent based on gasoline | Grams | Wt. percent based on polybutadiene | | 16 hours | 10 days |
| 5 | 7 | 0.95 | 19 | 1 | Firm gel | No change. |
| 5 | 7 | 0.7 | 14 | 2 | do | Do. |
| 5 | 7 | 0.3 | 6 | 1 | Slightly soft gel | Do. |
| 5 | 7 | 0.1 | 2 | 1 | Soft gel | Do. |
| 5 | 7 | 1.0 | 20 | None | No reaction; mixture remained fluid | Do. |

[1] The lithium nitrate catalyst was made up as a 10 percent solution in absolute alcohol.

A run was made in which 0.5 gram polybutadiene in 100 cc. gasoline (0.7 weight percent polybutadiene based on gasoline) was treated with 0.15 gram $SO_2$ (30 weight percent based on polybutadiene) in the presence of 1 cc. lithium nitrate solution as a catalyst. No gel formed. After 10 days there was no change in appearance of the solution. In this run the elastomer is below the lower limit of elastomer employed in the invention which requires at least about 1% elastomer based upon the gasoline. Also, the sulfur dioxide is well in excess of the upper limit, since the invention requires not more than about 20% and preferably lower proportion of sulfur dioxide based upon the elastomer.

Another run was made in which 2 grams sulfur dioxide was added to a solution containing 5 grams polybutadiene in 100 cc. gasoline. These amounts correspond to 7 weight percent polybutadiene based on gasoline and 40 weight percent sulfur dioxide based on polybutadiene. As a catalyst 1 cc. of lithium nitrate was used. A hard gel was formed which was unstable as evidenced by the separation of gasoline. In this run although the elastomer proportion is within the range of the proportions of elastomer of the invention, the sulfur dioxide is well in excess of the range of sulfur dioxide of the invention.

EXAMPLE II

A sample of polybutadiene (5 grams), prepared by emulsion polymerization at 41° F. and having a Monney value (ML-4) of 42, was dissolved in 100 cc. of 60 octane gasoline (7 weight percent based on the gasoline). The gasoline employed was a blend of isooctane and n-heptane. One cc. of a 10 percent lithium nitrate solution in absolute alcohol and 0.2 gram of sulfur dioxide were added (4 weight percent sulfur dioxide based on polybutadiene). After 16 hours the mixture had set to a firm gel. After 10 days no further change was observed.

EXAMPLE III

Eight grams of natural rubber (smoked sheet) was treated with 100 cc. of said 60 octane gasoline. The mixture was shaken to dissolve the rubber. Upon standing it set to a firm gel.

Eight grams of polybutadiene described in Example II was treated with 100 cc. of said 60 octane gasoline and the mixture shaken. A very fluid solution resulted which appeared to have substantially the same viscosity as the gasoline. No gelling occurred. It is noted that here no catalyst was present.

The immediately preceding two runs show that natural rubber and synthetic elastomer are not equivalents because while the natural rubber gelled the gasoline, the polybutadiene did not do so.

EXAMPLE IV

Eight grams of butadiene-styrene rubber (approximately 70/30 charge ratio) was dissolved in 100 cc. benzene (8.9 weight percent rubber based on benzene) and one cc. of a 10 percent $LiNO_3$ solution in absolute alcohol was added. Sulfur dioxide (0.43 gram) was then introduced (5.3 weight percent based on butadiene-styrene rubber). The solution became viscous and after standing 16 hours a firm gel formed.

EXAMPLE V

The following data shows the effect on the physical nature of the gel when the proportion of sulfur dioxide is varied. Into each of four bottles was introduced 150 ml. of a solution prepared by dissolving 100 grams of polybutadiene rubber (Mooney value ML-4 of 20, prepared by emulsion polymerization at 41° F.) in two-liters of 60 octane gasoline and one milliliter of a ten percent solution of lithium nitrate in absolute alcohol. Weighed amounts of sulfur dioxide were then introduced and the bottles allowed to stand for a period of three weeks.

Observations of these tests are tabulated below:

| Run | Percent polybutadiene (Based on gasoline) approximate | Percent $SO_2$ (Based on polymer) | Appearance next day | Appearance after 3 weeks |
|---|---|---|---|---|
| 1 | 7 | 0.67 | Very fluid gel. | Unchanged. |
| 2 | 7 | 1.33 | Soft, almost fluid. | Do. |
| 3 | 7 | 4.6 | Stiff gel | Do. |
| 4 | 7 | 7.7 | Firm gel | Slight syneresis. |

The gel from "2" of the above series was stored in a refrigerator for several hours at a temperature of —20° C. Syneresis occurred. After being returned to room temperature, the gel could be restored by shaking.

EXAMPLE VI

A series of runs was made in which the concentration of polymer or elastomer was varied. Data on these runs are tabulated below.

| Run | Weight Percent polybutadiene (Based on gasoline) | Weight percent $SO_2$ (Based on polybutadiene) | Appearance next day | Appearance after 8 days |
|---|---|---|---|---|
| 1 | 1.1 | 4.1 | Liquid | Gelled and separated. |
| 2 | 1.6 | 4.1 | do | Fluid gel. |
| 3 | 2.5 | 2.7 | Fluid gel | Do. |
| 4 | 3.3 | 2.0 | Soft gel* | Soft gel. |

*Brookfield viscosity just above 1,000 poises.

When the alcohol solution of the lithium nitrate catalyst is added to the hydrocarbon a very fine dispersion is formed indicating that a mechanically formed dispersion can be employed.

Reasonable variations and modification are possible within the scope of the foregoing disclosure and the appended claims to the invention, the essence of which is that gelled hydrocarbon products have been set forth and that the said products can be prepared by admixing a minor quantity of a synthetic elastomer with a normally liquid hydrocarbon and a catalytic proportion of a catalyst effective to cause reaction between olefin compounds and sulfur dioxide and then adding sulfur dioxide to the admixture thus obtained in a quantity sufficient to cause the gelation of the mix upon standing, and allowing the mass to stand until gelation has occurred, the proportions of synthetic elastomer and sulfur dioxide employed being as described herein.

We claim:

1. The preparation of a gelled hydrocarbon product which comprises dissolving in a normally liquid hydrocarbon 1–10% by weight, of said liquid hydrocarbon, of a synthetic hydrocarbon elastomer, having an appreciable degree of unsaturation, soluble therein, adding to the solution thus obtained a catalyst effective to cause reaction between an olefinic compound and sulfur dioxide in a proportion effective to cause said reaction, then adding 0.5–20% by weight, of said elastomer, of sulfur dioxide to the resulting mass and then allowing the mass to react and to stand until gel formation occurs, the said elastomer being selected from the group consisting of a homopolymer of a conjugated diene and copolymers of a conjugated diene with at least one of styrene, alkyl-substituted styrenes, methyl acrylate, methyl methacrylate, methyl vinyl ketone, acrylonitrile, methacrylonitrile.

2. The preparation of a gelled hydrocarbon product which comprises dissolving in a hydrocarbon selected from the group consisting of gasoline, naphtha, kerosene, benzene, xylene, toluene, a pentane, a hexane, a heptane, an octane, cyclohexane, and methylcyclohexane, 1–10% by weight, of said hydrocarbon, of a synthetic elastomer having an appreciable degree of unsaturation and selected from the group consisting of a homopolymer of a conjugated diene and copolymers of a conjugated diene with at least one of styrene, alkyl-substituted styrenes, methyl acrylate, methyl methacrylate, methyl vinyl ketone, acrylonitrile, methacrylonitrile which are soluble in said hydrocarbon, adding to the solution thus obtained in catalytic proportion a catalyst effective to cause reaction between olefinic compounds and sulfur dioxide, then adding 0.5–20% by weight, of said elastomer, of sulfur dioxide to the mass to cause gel formation upon standing of the mass and allowing the final mass to stand to form the said gelled hydrocarbon.

3. The preparation of a gelled product according to claim 2 wherein the catalyst is selected from the group consisting of an alkali metal nitrate, ammonium nitrate, potassium persulfate, hydrogen peroxide, an organic peroxide, a hydroperoxide, nitric acid, diazoaminobenzene, and peracetic acid.

4. The preparation of a gelled product according to claim 2 wherein the catalyst is lithium nitrate.

5. The preparation of a gelled hydrocarbon product which comprises dissolving in a normally liquid hydrocarbon 1–10 grams per hundred grams of hydrocarbon of a synthetic elastomer soluble therein and having an appreciable degree of unsaturation, adding to the solution thus obtained 0.05–5 parts per 100 parts of elastomer of a catalyst effective to cause reaction between olefinic compounds and sulfur dioxide, then adding 0.5 to 20 parts by weight, per hundred parts of said elastomer, of sulfur dioxide to the mass thus obtained at a temperature in the range 10–50° C. and then allowing the resulting final mass to stand until said gelled hydrocarbon is obtained; the said elastomer being selected from the group consisting of a homopolymer of a conjugated diene and copolymers of a conjugated diene with at least one of styrene, alkyl-substituted styrenes, methyl acrylate, methyl methacrylate, methyl vinyl ketone, acrylonitrile, methacrylonitrile.

6. The preparation of a gelled product according to claim 5 wherein the catalyst is lithium nitrate dissolved in alcohol.

7. The preparation of a gelled hydrocarbon product which comprises dissolving 1–10% by weight of a conjugated diene hydrocarbon homopolymer having an appreciable degree of unsaturation in a liquid hydrocarbon containing hydrocarbon compounds which are contained in gasoline, adding to the solution thus obtained a catalytic proportion of a catalyst effective to cause reaction between olefinic compounds and sulfur dioxide, then adding 0.5–20% by weight of said homopolymer of the sulfur dioxide to the mass thus obtained, and then allowing the final mixture thus obtained to stand to form the said gelled product.

8. The preparation of a gelled product according to claim 7, wherein the hydrocarbon is gasoline, the homopolymer is a polybutadiene and the catalyst is lithium nitrate dissolved in a solvent adapted to cause admixture of the catalyst with said hydrocarbon and homopolymer.

9. The preparation of a gelled product according to claim 8 wherein the temperature is in the range 15–35° C.

10. The preparation of a gelled product according to claim 7 wherein the hydrocarbon is gasoline, the homopolymer is a polyisoprene and the catalyst is lithium nitrate dissolved in a solvent adapted to cause admixture of the catalyst with said hydrocarbon and homopolymer.

11. The preparation of a gelled product according to claim 7 wherein the hydrocarbon is gasoline, and the homopolymer is a polypentadiene and the catalyst is lithium nitrate dissolved in a solvent adapted to cause admixture of the catalyst with said hydrocarbon and homopolymer.

12. The preparation of a gelled hydrocarbon product according to claim 7 wherein the homopolymer is a polybutadiene having a Mooney value (ML–4) of about 20.

13. The preparation of a gelled hydrocarbon product according to claim 7 wherein the homopolymer is a polybutadiene having a Mooney value (ML–4) of about 30.

14. The preparation of a gelled hydrocarbon product according to claim 7 wherein the homopolymer is a polybutadiene having a Mooney value (ML–4) of about 42.

15. The preparation of a gelled hydrocarbon product which comprises dissolving a copolymer of a conjugated diene hydrocarbon and a vinyl monomer, said copolymer having an appreciable degree of unsaturation, in a liquid hydrocarbon containing a substantial proportion of aromatic hydrocarbons, said copolymer being present in 1–10% by weight of said hydrocarbon, adding to the solution thus obtained a catalytic quantity of a catalyst effective to cause reaction between olefinic compounds and sulfur dioxide, then adding sulfur dioxide to the mass thus obtained, the sulfur dioxide being added in 0.5–20% by weight of said copolymer, and then allowing the final mass thus obtained to stand to form the said gelled product.

16. The preparation of a gelled product according to claim 15 wherein the copolymer is a butadiene-styrene copolymer and the catalyst is lithium nitrate dissolved in a solvent adapted to cause admixture of the catalyst with said hydrocarbon and said copolymer.

17. The preparation of a gelled product according to claim 16 wherein the temperature is in the range 15–35° C.

18. The preparation of a gelled product according to claim 15 wherein the copolymer is a butadiene-methyl acrylate copolymer and the catalyst is lithium nitrate dissolved in a solvent adapted to cause admixture of the catalyst with said hydrocarbon and said copolymer.

19. The preparation of a gelled product according to claim 15 wherein the copolymer is a butadiene-methyl methacrylate copolymer and the catalyst is lithium nitrate dissolved in a solvent adapted to cause admixture of the catalyst with said hydrocarbon and said copolymer.

20. The preparation of a gelled product according to claim 15 wherein the copolymer is an isoprenestyrene copolymer and the catalyst is lithium nitrate dissolved in a solvent adapted to cause admixture of the catalyst with said hydrocarbon and said copolymer.

21. The preparation of a gelled product according to claim 15 wherein the copolymer is a butadiene-vinylpyridine copolymer and the catalyst is lithium nitrate dissolved in a solvent adapted to cause admixture of the catalyst with said hydrocarbon and said copolymer.

22. The preparation of a gelled product according to claim 15 wherein the copolymer is a butadiene-2-methyl-5-vinylpyridine copolymer and the catalyst is lithium nitrate dissolved in a solvent adapted to cause admixture of the catalyst with said hydrocarbon and said copolymer.

23. In the preparation of a gelled liquid hydrocarbon the steps comprising dissolving in said hydrocarbon a synthetic elastomer having an appreciable degree of unsaturation, admixing with the solution thus obtained a catalyst effective to cause reaction between olefinic compounds and sulfur dioxide and then adding sulfur dioxide to the mass in a quantity sufficient to cause gelling upon standing, the said elastomer being selected from the group consisting of a homopolymer of a conjugated diene and copolymers of a conjugated diene with at least one of styrene, alkyl-substituted styrenes, methyl acrylate, methyl methacrylate, methyl vinyl ketone, acrylonitrile, methacrylonitrile.

24. A gelled hydrocarbon composition containing a normally liquid hydrocarbon and a small proportion of a synthetic elastomer having an appreciable degree of unsaturation therein, a catalytic proportion of a catalyst effective to cause a reaction between an olefinic compound and sulfur dioxide, and sulfur dioxide, at least a portion of said hydrocarbon, sulfur dioxide, synthetic elastomer and catalyst being present as a reaction product of said sulfur dioxide and said synthetic elastomer in said hydrocarbon and at least a portion of the said hydrocarbon, elastomer and sulfur dioxide being present in said composition in a physical gel structure; the said elastomer being selected from the group consisting of a homopolymer of a conjugated diene and copolymers of a conjugated diene with at least one of styrene, alkyl-substituted styrenes, methyl acrylate, methyl methacrylate, methyl vinyl ketone, acrylonitrile, methacrylonitrile.

25. A gelled hydrocarbon composition containing a normally liquid hydrocarbon, 1–10% by weight of said hydrocarbon of a synthetic hydrocarbon elastomer having an appreciable degree of unsaturation and soluble in said hydrocarbon, 0.5–20% by weight of said elastomer of sulfur dioxide, and a catalytic proportion of a catalyst effective to cause a reaction between an olefinic compound and sulfur dioxide, the said elastomer being selected from the group consisting of a homopolymer of a conjugated diene and copolymers of a conjugated diene with at least one of styrene, alkyl-substituted styrenes, methyl acrylate, methyl methacrylate, methyl vinyl ketone, acrylonitrile, methacrylonitrile.

26. A composition according to claim 25 wherein the hydrocarbon is selected from the group consisting of gasoline, naphtha, kerosene, benzene, xylene, toluene, a pentane, a hexane, a heptane, an octane, cyclohexane, and methylcyclohexane.

27. A composition according to claim 26 wherein the catalyst is selected from the group consisting of an alkali metal nitrate, ammonium nitrate, potassium persulfate, hydrogen peroxide, an organic peroxide, a hydroperoxide, nitric acid, diazoaminobenzene, and peracetic acid.

28. A composition according to claim 26 wherein the catalyst is lithium nitrate.

29. A composition according to claim 26 wherein the catalyst is lithium nitrate dissolved in alcohol.

30. A gelled hydrocarbon composition consisting essentially of a normally liquid hydrocarbon and a small proportion of a catalytic reaction product of a synthetic elastomer having an appreciable degree of unsaturation therein with sulfur dioxide in the presence of a catalyst effective to cause the reaction and also containing at least a portion of said hydrocarbon, said elastomer, sulfur dioxide, and said catalyst effective to cause a reaction between an olefinic compound and sulfur dioxide being in part present in said composition in a physical gel structure; the said elastomer being at least one selected from the group consisting of a homopolymer of a conjugated diolefin hydrocarbon and copolymer of a conjugated diolefin hydrocarbon with a vinyl monomer.

References Cited
UNITED STATES PATENTS

| | | | |
|---|---|---|---|
| 2,439,610 | 4/1948 | Morris | 252—45 |
| 2,553,568 | 5/1951 | Finkelstein | 44—7 |
| 2,610,114 | 9/1952 | Fischer | 44—7 |

CARL D. QUARFORTH, Primary Examiner

U.S. Cl. X.R.
44—7 D; 166—283